(12) United States Patent
Rajput et al.

(10) Patent No.: US 11,888,894 B2
(45) Date of Patent: Jan. 30, 2024

(54) METHODS, SYSTEMS, AND COMPUTER READABLE MEDIA FOR MITIGATING NETWORK FUNCTION (NF) UPDATE AND DEREGISTER ATTACKS

(71) Applicant: Oracle International Corporation, Redwood Shores, CA (US)

(72) Inventors: Jay Rajput, Bangalore (IN); Virendra Singh, Bangalore (IN); Amarnath Jayaramachar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 100 days.

(21) Appl. No.: 17/236,775

(22) Filed: Apr. 21, 2021

(65) Prior Publication Data

US 2022/0345486 A1    Oct. 27, 2022

(51) Int. Cl.
*H04L 9/40* (2022.01)
*H04L 9/32* (2006.01)

(52) U.S. Cl.
CPC ........ *H04L 63/1466* (2013.01); *H04L 9/3239* (2013.01)

(58) Field of Classification Search
CPC . H04L 63/1466; H04L 9/3239; H04L 9/0891; H04W 12/08
See application file for complete search history.

(56) References Cited

U.S. PATENT DOCUMENTS

| 1,872,857 A | 8/1931 | Wesson et al. |
| 5,835,087 A | 11/1998 | Herz et al. |
| 6,185,612 B1 | 2/2001 | Jensen et al. |

(Continued)

FOREIGN PATENT DOCUMENTS

| CN | 1964316 | 5/2007 |
| CN | 103039049 B | 8/2016 |

(Continued)

OTHER PUBLICATIONS

Notification of Transmittal of the International Search Report and the Written Opinion of the International Searching Authority, or the Declaration for International Application No. PCT/US2022/026418 (dated Jul. 8, 2022).

(Continued)

*Primary Examiner* — Taghi T Arani
*Assistant Examiner* — Blake I Narramore
(74) *Attorney, Agent, or Firm* — Jenkins, Taylor & Hunt, P.A.

(57) ABSTRACT

A method for mitigating network function (NF) update and deregister attacks includes, at an NF repository function (NRF) implemented by at least one processor, receiving, from an NF, an NFRegister request including a hash of a first authentication string, an NF instance identifier, and an NF profile. The method further includes storing the hash of the first authentication string. The method further includes registering the NF by storing the NF profile in an NF profile database. The method further includes receiving a first NFUpdate or NFDeregister request including the NF instance identifier. The method further includes using the stored hash of the first authentication string to validate or reject the first NFUpdate or NFDeregister request.

9 Claims, 7 Drawing Sheets

(56) References Cited

U.S. PATENT DOCUMENTS

| | | | |
|---|---|---|---|
| 6,298,383 | B1 | 10/2001 | Gutman et al. |
| 7,266,837 | B2 | 9/2007 | Monjas-Llorente et al. |
| 8,127,016 | B2 | 2/2012 | Westman et al. |
| 8,171,032 | B2 | 5/2012 | Herz |
| 8,218,459 | B1 | 7/2012 | Stucker |
| 8,218,490 | B2 | 7/2012 | Rydnell et al. |
| 8,626,157 | B2 | 1/2014 | Nas et al. |
| 8,929,360 | B2 | 1/2015 | Agarwal et al. |
| 9,094,819 | B2 | 7/2015 | McCann et al. |
| 9,253,163 | B2 | 2/2016 | Donovan |
| 9,967,148 | B2 | 5/2018 | Goyal et al. |
| 10,033,736 | B2 | 7/2018 | McCann |
| 10,075,435 | B1* | 9/2018 | Byrd ................. H04L 63/1458 |
| 10,547,613 | B1 | 1/2020 | Roths et al. |
| 10,609,154 | B2 | 3/2020 | Talebi Fard et al. |
| 10,833,938 | B1 | 11/2020 | Rajput et al. |
| 10,834,571 | B1 | 11/2020 | Yau et al. |
| 10,903,999 | B1* | 1/2021 | Raman ..................... H04L 9/14 |
| 11,558,737 | B2 | 1/2023 | Rajput et al. |
| 11,570,689 | B2 | 1/2023 | Rajput et al. |
| 11,627,467 | B2 | 4/2023 | Rajput et al. |
| 11,638,155 | B2 | 4/2023 | Rajput et al. |
| 11,695,563 | B2 | 7/2023 | Rajput et al. |
| 2003/0227894 | A1 | 12/2003 | Wang et al. |
| 2005/0235000 | A1 | 10/2005 | Keil |
| 2006/0078119 | A1 | 4/2006 | Jee et al. |
| 2006/0155871 | A1 | 7/2006 | Ilkka et al. |
| 2006/0259759 | A1 | 11/2006 | Maino et al. |
| 2007/0019616 | A1 | 1/2007 | Rantapuska et al. |
| 2007/0250642 | A1 | 10/2007 | Thubert et al. |
| 2007/0297419 | A1 | 12/2007 | Askerup et al. |
| 2008/0010669 | A1 | 1/2008 | Aittola et al. |
| 2008/0039104 | A1 | 2/2008 | Gu et al. |
| 2009/0080440 | A1 | 3/2009 | Balyan et al. |
| 2009/0165017 | A1 | 6/2009 | Syed et al. |
| 2009/0232011 | A1 | 9/2009 | Li et al. |
| 2009/0265467 | A1 | 10/2009 | Peles |
| 2009/0305684 | A1 | 12/2009 | Jones et al. |
| 2009/0313379 | A1 | 12/2009 | Rydnell et al. |
| 2010/0291923 | A1 | 11/2010 | Zhou et al. |
| 2011/0165901 | A1 | 7/2011 | Baniel et al. |
| 2011/0195710 | A1 | 8/2011 | Nas et al. |
| 2011/0302244 | A1 | 12/2011 | McCann et al. |
| 2012/0155389 | A1 | 6/2012 | McNamee et al. |
| 2012/0157047 | A1 | 6/2012 | Chen et al. |
| 2012/0158994 | A1 | 6/2012 | McNamee et al. |
| 2012/0226814 | A1 | 9/2012 | Stucker |
| 2013/0097418 | A1 | 4/2013 | Bhatt et al. |
| 2013/0151845 | A1 | 6/2013 | Donovan |
| 2013/0185767 | A1 | 7/2013 | Tirupachur Comerica et al. |
| 2013/0290722 | A1 | 10/2013 | Kall et al. |
| 2016/0029216 | A1* | 1/2016 | Gonsalves ............ H04W 76/25 455/411 |
| 2016/0352696 | A1 | 12/2016 | Essigmann et al. |
| 2017/0012824 | A1 | 1/2017 | Goyal et al. |
| 2017/0214691 | A1 | 7/2017 | McCann |
| 2017/0250815 | A1* | 8/2017 | Cuende ................ G06Q 20/401 |
| 2018/0302414 | A1* | 10/2018 | Wagner ................ H04L 63/107 |
| 2018/0332471 | A1* | 11/2018 | Zhu ....................... H04L 63/061 |
| 2019/0260803 | A1 | 8/2019 | Bykampadi et al. |
| 2020/0036707 | A1* | 1/2020 | Callahan ................. H04L 67/53 |
| 2020/0036754 | A1 | 1/2020 | Livanos |
| 2020/0186359 | A1* | 6/2020 | Chan ..................... H04L 9/3273 |
| 2020/0213329 | A1* | 7/2020 | Simons ................. H04L 9/0618 |
| 2020/0245139 | A1 | 7/2020 | Nakarmi et al. |
| 2021/0044976 | A1* | 2/2021 | Avetisov ................ H04L 9/321 |
| 2021/0083965 | A1 | 3/2021 | Taft et al. |
| 2021/0250172 | A1 | 8/2021 | Choyi et al. |
| 2021/0288802 | A1 | 9/2021 | Muhanna et al. |
| 2021/0319132 | A1* | 10/2021 | Zhang ................ G06F 21/6227 |
| 2021/0385286 | A1 | 12/2021 | Wang et al. |
| 2022/0052992 | A1 | 2/2022 | Zhang et al. |
| 2022/0124468 | A1 | 4/2022 | Lu et al. |
| 2022/0225084 | A1 | 7/2022 | Rajput et al. |
| 2022/0255931 | A1* | 8/2022 | Avetisov ............... H04L 9/3263 |
| 2022/0346188 | A1 | 10/2022 | Malhotra |
| 2022/0360447 | A1 | 11/2022 | Rajput et al. |
| 2022/0360989 | A1 | 11/2022 | Rajput et al. |
| 2022/0360991 | A1 | 11/2022 | Rajput et al. |
| 2022/0361085 | A1 | 11/2022 | Rajput et al. |
| 2022/0369204 | A1 | 11/2022 | Jeong et al. |

FOREIGN PATENT DOCUMENTS

| | | |
|---|---|---|
| CN | 111163473 A | 5/2020 |
| EP | 1 848 150 A1 | 10/2007 |
| EP | 1 873 980 A1 | 1/2008 |
| EP | 3 588 862 A1 | 1/2020 |
| KR | 10-1506232 | 3/2015 |
| WO | WO 2007/125498 A1 | 11/2007 |
| WO | WO 2011/156274 A2 | 12/2011 |
| WO | WO 2020/053481 A1 | 3/2020 |
| WO | WO 2022/043130 A1 | 3/2022 |
| WO | WO 2022/235373 A1 | 11/2022 |
| WO | WO 2022/235374 A1 | 11/2022 |
| WO | WO 2022/235462 A1 | 11/2022 |
| WO | WO 2022/235463 A1 | 11/2022 |

OTHER PUBLICATIONS

Notification of Transmittal of the International Search Report and the Written Opinion of the International Searching Authority, or the Declaration for International Application No. PCT/US2022/026417 (dated Jul. 8, 2022).

Notification of Transmittal of the International Search Report and the Written Opinion of the International Searching Authority, or the Declaration for International Application No. PCT/US2022/023899 (dated Jul. 1, 2022).

Notice of Allowance and Fee(s) Due for U.S. Appl. No. 17/314,300 (dated Jun. 6, 2022).

Non-Final Office Action for U.S. Appl. No. 17/314,382 (dated May 23, 2022).

Non-Final Office Action for U.S. Appl. No. 17/145,143 (dated Mar. 15, 2022).

Notification of Transmittal of the International Search Report and the Written Opinion of the International Searching Authority, or the Declaration for U.S. Patent Application Serial No. PCT/US2021/064102 (dated Apr. 7, 2022).

Ericsson, "New Solution to KI#5: End-to-end integrity protection of HTTP body and method," 3GPP TSG-SA3 Meeting #102Bis-e, pp. 1-3 (Mar. 1-5, 2021).

"3rd Generation Partnership Project; Technical Specification Group Services and System Aspects; Security architecture and procedures for 5G system (Release 17)," 3GPP TS 33.501, V17.1.0, pp. 1-256 (Mar. 2021).

Commonly-assigned, co-pending U.S. Appl. No. 17/145,143 for "Methods, Systems, and Computer Readable Media for Preventing Subscriber Identifier Leakage," (Unpublished, filed Jan. 8, 2021).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).

Nokia et al., "Integrity protection of service request in indirect communication," 3GPP TSG-SA3, Meeting#100e, pp. 1-3 (Aug. 17-28, 2020).

"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-131 (Jul. 2020).

(56) References Cited

OTHER PUBLICATIONS

"5G; Security architecture and procedures for 5G System (3GPP TS 33.501 version 16.6.0 Release 16)," ETSI TS 133 501, V16.6.0, pp. 1-258 (Apr. 2021).
Notice of Allowance and Fee(s) Due for U.S. Appl. No. 17/308,972 (dated Nov. 18, 2022).
Commonly-assigned, co-pending U.S. Appl. No. 17/987,820 for "Methods, Systems, and Computer Readable Media for Detecting Stolen Access Tokens," (Unpublished, filed Nov. 15, 2022).
Housley et al. "Internet X.509 Public Key Infrastructure Certificate and CRL Profile," Network Working Group, Request for Comments: 2459, pp. 1-129 (Jan. 1999).
Jones et al., "JSON Web Token (JWT)," Internet Engineering Task Force (IETF), Request for Comments: 7519, pp. 1-30 (May 2015).
"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).
"3rd Generation Partnership Project; Technical Specification Group Services and System Aspects; Security architecture and procedures for 5G system (Release 17)," 3GPP TS 33.501, V17.7.0, pp. 1-292 (Sep. 2022).
Final Office Action for U.S. Appl. No. 17/314,382 (dated Nov. 9, 2022).
Restriction Requirement for U.S. Appl. No. 17/314,329 (dated Nov. 7, 2022).
Notice of Allowance and Fee(s) Due for U.S. Appl. No. 17/314,300 (dated Sep. 27, 2022).
Notice of Allowance and Fee(s) Due and Examiner-Initiated Interview Summary for U.S. Appl. No. 17/145,143 (dated Sep. 2, 2022).
Notice of Allowance and Fee(s) Due and Examiner-Initiated Interview Summary for U.S. Appl. No. 17/145,143 (dated Aug. 11, 2022).
Non-Final Office Action for U.S. Appl. No. 17/308,972 (dated Aug. 5, 2022).
Notification of Transmittal of the International Search Report and the Written Opinion of the International Searching Authority, or the Declaration for International Application No. PCT/US2022/023894 (dated Aug. 1, 2022).
"3rd Generation Partnership Project; Technical Specification Group Services and System Aspects; Study on Enhancements to the Service-Based Architecture (Release 16)," 3GPP TR 23.742, V1.0.0, pp. 1-101 (Sep. 2018).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
Commonly-assigned, co-pending U.S. Appl. No. 17/314,329 for "Methods, Systems, and Computer Readable Media for Protecting Against Mass Network Function (NF) Deregistration Attacks," (Unpublished, filed May 7, 2021).
Commonly-assigned, co-pending U.S. Appl. No. 17/314,382 for "Methods, Systems, and Computer Readable Media for Single-Use Authentication Messages," (Unpublished, filed May 7, 2021).
Commonly-assigned, co-pending U.S. Appl. No. 17/314,300 for "Methods, Systems, and Computer Readable Media for Hiding Network Function Instance Identifiers," (Unpublished, filed May 7, 2021).
Commonly-assigned, co-pending U.S. Appl. No. 17/308,972 for "Methods, Systems, and Computer Readable Media for Generating and Using Single-Use Oauth 2.0 Access Tokens for Securing Specific Service-Based Architecture (SBA) Interfaces," (Unpublished, filed May 5, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Corrected Notice of Allowability for U.S. Appl. No. 15/003,647 (dated Jun. 28, 2018).
Communication pursuant to Article 94(3) EPC for European Patent Application Serial No. 11 792 956.2 (dated Apr. 23, 2018).
Notice of Allowance and Fee(s) Due for U.S. Appl. No. 15/003,647 (dated Mar. 7, 2018).
Notice of Allowance and Fee(s) Due for U.S. Appl. No. 14/795,601 (dated Dec. 28, 2017).
Applicant Initiated Interview Summary for U.S. Appl. No. 14/795,601 (dated Nov. 24, 2017).
Non-Final Office Action for U.S. Appl. No. 15/003,647 (dated Oct. 10, 2017).
Non-Final Office Action for U.S. Appl. No. 14/795,601 (dated Aug. 18, 2017).
Notification to grant a Chinese patent for Chinese Patent Application No. ZL201180032307.4 (dated Jun. 23, 2016).
Extended European Search Report for European Application No. 11792956.2 (dated Feb. 8, 2016).
Notification of the Third Office Action for Chinese Application No. 201180032307.4 (dated Jan. 25, 2016).
"RADIUS," https://en.wikipedia.org/wiki/RADIUS#Accounting, pp. 1-17 (Nov. 27, 2015).
Notice of Allowance for U.S. Appl. No. 13/712,481 dated Oct. 20, 2015.
Notice of Allowance for U.S. Appl. No. 13/712,481 dated Sep. 25, 2015.
Notification of the Second Office Action for Chinese Application No. 201180032307.4 (dated Jul. 17, 2015).
Commonly-assigned, co-pending U.S. Appl. No. 14/795,601 for "Methods, Systems, and Computer Readable Media for Selective Diameter Topology Hiding," (Unpublished, filed Jul. 9, 2015).
Non-Final Office Action for U.S. Appl. No. 13/832,137 (dated Jun. 2, 2015).
Non-Final Office Action for U.S. Appl. No. 13/712,481 (dated Apr. 29, 2015).
Notice of Allowance for U.S. Appl. No. 13/154,119 dated Apr. 16, 2015.
Notice of Allowance and Applicant Initiated Interview Summary for U.S. Appl. No. 13/154,119 dated Mar. 17, 2015.
Advisory Action Before the Filing of an Appeal Brief for U.S. Appl. No. 13/712,481 (dated Mar. 11, 2015).
Email Regarding Decision to Grant for Korean Patent Application No. 2012-7034449 (dated Mar. 2, 2015).
Final Office Action for U.S. Appl. No. 13/712,481 (dated Dec. 3, 2014).
Notification of the First Office Action for Chinese Patent Application No. 201180032307.4 (dated Nov. 4, 2014).
Office Action for Korean Patent Application No. 2012-7034449 (dated Oct. 14, 2014).
Non-Final Office Action for U.S. Appl. No. 13/712,481 (dated May 8, 2014).
Notice of Preliminary Rejection for Korean Patent Application No. 2012-7034449 (dated Apr. 25, 2014).
Advisory Action for U.S. Appl. No. 13/154,119 dated Jan. 22, 2014.
Zhang et al., "TOHIP: A topology-hiding multipath routing protocol in mobile ad hoc networks," Ad Hoc Networks 21, pp. 109-122 (2014).
Final Office Action for U.S. Appl. No. 13/154,119 dated Oct. 25, 2013.
Notice of Allowance and Fee(s) Due for U.S. Appl. No. 13/021,402 (dated Sep. 9, 2013).

(56) References Cited

OTHER PUBLICATIONS

Non-Final Office Action for U.S. Appl. No. 13/154,119 dated May 2, 2013.
Communication of European publication number and information on the application of Article 67(3) EPC for European Patent Application No. 11792956.2 (dated Mar. 13, 2013).
"EliteDSC—LTE Roaming," http://www.elitecore.com/telecompractices/lteroaming.html, pp. 1-2 (Copyright 2013).
Non-Final Office Action for U.S. Appl. No. 13/021,402 (dated Nov. 8, 2012).
Hardt, "The OAuth 2.0 Authorization Framework", Internet Engineering Task Force (IETF) Request for Comments (RFC) 6749 , pp. 1-76 (2012).
Notification of Transmittal of the International Search Report and the Written Opinion of the International Searching Authority, or the Declaration for International Application No. PCT/US2011/039285 (dated Feb. 9, 2012).
Notification of Transmittal of the International Search Report and the Written Opinion of the International Searching Authority, or the Declaration for International Application No. PCT/US2011/023752 (dated Oct. 26, 2011).
"Topology Hiding," Chapter 13, Cisco Unified Border Element (SP Edition) Configuration Guide: Distributed Model, pp. 13-1-13-10 (Mar. 29, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).
Chiba et al., "Dynamic Authorization Extensions to Remote Authentication Dial In User Service (RADIUS)," RFC 5176, pp. 1-31 (Jan. 2008).
"Features—Kamailio (OpenSER) SIP Server," http://www.kamailio.org/w/features/, pp. 1-3 (Copyright 2008-2015).
Rouse, M., "Platform," searchservervirtualization.techtarget.com/definition/platform, pp. 1-2 (Sep. 2006).
Leach et al., "A Universally Unique IDentifier (UUID) URN Namespace," Network Working Group, RFC 4122, pp. 1-32 (Jul. 2005).
Calhoun et al., "Diameter Base Protocol," RFC 3588, pp. 1-147 (Sep. 2003).
Calhoun et al., "Diameter Base Protocol,"draft-ietf-aaa-diameter-07, Section 6.3, p. 68 (Jul. 2001).
Calhoun et al., "Diameter Base Protocol," The Internet Society, pp. 1-64 (Mar. 2001).
Rigney et al., "RADIUS Accounting," RFC 2866, pp. 1-28 (Jun. 2000).
Rigney et al., "Remote Authentication Dial In User Service (RADIUS)," RFC 2865, pp. 1-68 (Jun. 2000).
Farago et al., "Virtual path network topology optimization using random graphs," INFOCOM '99, 18th Annual Joint Conference of the IEEE Computer and Communications Societies, vol. 2, pp. 491-496 (Mar. 1999).
Goldschlag et al., "Hiding Routing Information," Springer Berlin Heidelberg, First International Workshop Cambridge, U.K., May 30-Jun. 1, 1996, Information Hiding Lecture Notes in Computer Science, vol. 1174, pp. 137-150 (1996).
Corrected Notice of Allowability for U.S. Appl. No. 17/314,382 (dated May 26, 2023).
Supplemental Notice of Allowability for U.S. Appl. No. 17/308,972 (dated Mar. 1, 2023).
Notice of Allowance and Fee(s) Due for U.S. Appl. No. 17/314,382 (dated Feb. 16, 2023).
Notice of Allowance and Fee(s) Due for U.S. Appl. No. 17/314,329 (dated Dec. 20, 2022).

* cited by examiner

METHODS, SYSTEMS, AND COMPUTER READABLE MEDIA FOR MITIGATING NETWORK FUNCTION (NF) UPDATE AND DEREGISTER ATTACKS

TECHNICAL FIELD

The subject matter described herein relates to network security. More particularly, the subject matter described herein relates to methods, systems, and computer readable media for mitigating NF update and deregister attacks.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is that there is a lack of a sufficient security mechanism for NF update and deregister operations. In order to be discoverable by consumer NFs in a network, a producer NF registers its NF profile with the NF repository function (NRF). This operation is referred to in 3GPP standards documents as the NFRegister service operation. In this document, "NF register operation" and "NFRegister service operation" are used interchangeably to refer to the operation performed when an NF registers its NF profile with the NRF. Consumer NFs subscribe with the NRF to receive a copy of the NF profile of a producer NF and to be notified of changes in the NF profile so that the consumer NFs can contact the producer NF to access one or more services provided by the producer NF.

In addition to the NF register operation, the NRF provides NF update and NF deregister operations. These operations are respectively referred to in 3GGP standards as the "NFUpdate service operation" and the "NFDeregister service operation". The NF update operation is used by an NF to update or replace its NF profile with the NRF. The terms "NFUpdate service operation" and "NF update service operation" are used interchangeably herein to refer to an operation performed by an NF to update or replace its NF profile with the NRF. The NFDeregister service operation is used by an NF to deregister or delete its NF profile with the NRF. The terms "NFDeregister service operation" and "NF deregister service operation" are used interchangeably herein to refer to an operation performed by an NF to deregister or delete its NF profile with the NRF.

Because of the lack of security for the NF update and deregister operations, an unauthorized party can modify, replace, or deregister the NF profile of an NF. The modifying, replacing, or deregistering, either intentionally or unintentionally, of the NF profile of an NF at the NRF without authorization is referred to herein as an NF update or deregister attack. An NF update or deregister attack may be intentional where an attacker seeks to modify and NF profile without authorization or unintentional where an NF accidentally modifies the NF profile of another NF, for example, by sending an NF update request identifying the target NF profile of another NF. The intentional or unintentional unauthorized updating of an NF profile can prevent other NFs from discovering the NF profile or cause the NFs to discover a modified NF profile, which could be used to attack the subscribing NFs, for example, by sending malicious updates to the subscribing NFs.

Some suggested solutions to securing the NF update and deregister operations are to use transport layer security (TLS), network domain security/Internet protocol (NDS/IP), and client credentials assertion (CCA)-based client NF authentication and/or authorization. However, such mechanisms have implementation complexities, do not provide end-to-end security, and do not provide multifactor authentication.

In light of these and other difficulties, there exists a need for a method for providing enhanced security measures to reduce the likelihood of successful NF update and deregister attacks.

SUMMARY

A method for mitigating network function (NF) update and deregister attacks includes, at an NF repository function (NRF) implemented by at least one processor, receiving, from an NF, an NFRegister request including a hash of a first authentication string, an NF instance identifier, and an NF profile. The method further includes storing the hash of the first authentication string. The method further includes registering the NF by storing the NF profile in an NF profile database. The method further includes receiving a first NFUpdate or NFDeregister request including the NF instance identifier. The method further includes using the stored hash of the first authentication string to validate or reject the NFUpdate or NFDeregister request.

According to another aspect of the subject matter described herein, receiving a first NFUpdate or NFDeregister request includes receiving a first NFUpdate request including the first authentication string and using the stored hash of the first authentication string to validate or reject the first NFUpdate or NFDeregister request includes computing a hash of an authentication string from the first NFUpdate request, comparing the hash of the authentication string from the first NFUpdate request to the stored hash of the first authentication string, determining that the hash of the authentication string from the first NFUpdate request matches the stored hash of the first authentication string, and, in response, validating the first NFUpdate request.

According to another aspect of the subject matter described herein, the first NFUpdate request includes a hash of a second authentication string and the method further comprises storing the hash of the second authentication string and using the hash of the second authentication string to validate a second NFUpdate or NFDeregister request received after the first NFUpdate request.

According to another aspect of the subject matter described herein, receiving a first NFUpdate or NFDeregister request includes receiving a first NFDeregister request including an authentication string that is different from the first authentication string and using the stored hash of the first authentication string to validate or reject the first NFDeregister request includes computing a hash of the authentication string from the first NFDeregister request, comparing the hash of the authentication string from the first NFDeregister request to the stored hash of the first authentication string, determining that the hash of the authentication string from the first NFDeregister request does not match the stored hash of the first authentication string, and, in response, rejecting the first NFDeregister request.

According to another aspect of the subject matter described herein, receiving a first NFUpdate or NFDeregister request includes receiving a first NFDeregister request including the first authentication string and using the stored hash of the first authentication string to validate or reject the first NFUpdate or NFDeregister request includes computing a hash of the first authentication string from the first NFDeregister request, comparing the hash of the first authentication string from the first NFDeregister request to the stored hash of the first authentication string, determining that the hash of the first authentication string from the first NFDeregister request matches the stored hash of the first authentication string, and, in response, validating the first NFDeregister request.

According to another aspect of the subject matter described herein, a method for mitigating network function (NF) update and deregister attacks includes, at a network function including at least one processor, generating an NFRegister request including a hash of a first authentication string, an NF instance identifier, and an NF profile. The method further includes transmitting the NFRegister request to an NF repository function (NRF). The method further includes receiving, from the NRF, confirmation of registration of the NF profile with the NRF. The method further includes generating a first NFUpdate or NFDeregister request. The method further comprises including, in the first NFUpdate or NFDeregister request, the NF instance identifier and the first authentication string. The method further includes transmitting the first NFUpdate or NFDeregister request to the NRF. The method further includes receiving, from the NRF, confirmation of successful processing of the first NFUpdate or NFDeregister request.

According to another aspect of the subject matter described herein, generating a first NFUpdate or NFDeregister request includes generating a first NFUpdate request, and including, in the first NFUpdate request, a hash of a second authentication string.

According to another aspect of the subject matter described herein, the method for mitigating NF update and deregister attacks includes generating a second NFUpdate request, including, in the second NFUpdate request, the second authentication string, and transmitting the second NFUpdate request to the NRF.

According to another aspect of the subject matter described herein, generating the first NFUpdate or NFDeregister request includes generating a first NFDeregister request.

According to another aspect of the subject matter described herein, generating the first NFDeregister request comprises including, in the first NFDeregister request, the first authentication string.

According to another aspect of the subject matter described herein, a system for mitigating network function (NF) update and deregister attacks is provided. The system includes an NF repository function (NRF) including at least one processor and a memory. The system further includes an NFUpdate/NFDeregister operation validator implemented by the at least one processor for receiving, from an NF, an NFRegister request including a hash of a first authentication string, an NF instance identifier, and an NF profile, storing the hash of the first authentication string, registering the NF by storing the NF profile in an NF profile database, receiving a first NFUpdate or NFDeregister request including the NF instance identifier, and using the stored hash of the first authentication string to validate or reject the first NFUpdate or NFDeregister request.

According to another aspect of the subject matter described herein, a system for mitigating network function (NF) update and deregister attacks is provided. The system includes a network function including at least one processor. The system further includes an NFRegister/Update/Deregister request generator implemented by the at least one processor for generating an NFRegister request including a hash of a first authentication string, an NF instance identifier, and an NF profile, transmitting the NFRegister request to an NF repository function (NRF), receiving, from the NRF, confirmation of registration of the NF profile with the NRF, generating a first NFUpdate or NFDeregister request, including, in the first NFUpdate or NFDeregister request, the NF instance identifier and the first authentication string, transmitting the first NFUpdate or NFDeregister request to the NRF; and receiving, from the NRF, confirmation of successful processing of the first NFUpdate or NFDeregister request.

According to another aspect of the subject matter described herein, a non-transitory computer readable medium having stored thereon executable instructions that when executed by a processor of a computer control the computer to perform steps is provided. The steps are performed at a network function (NF) repository function (NRF) implemented by at least one processor. The steps include receiving, from an NF, an NFRegister request including a hash of a first authentication string, an NF instance identifier, and an NF profile. The steps further include storing the hash of the first authentication string. The steps further include registering the NF by storing the NF profile in an NF profile database. The steps further include receiving a first NFUpdate or NFDeregister request including the NF instance identifier. The steps further include using the stored hash of the first authentication string to validate or reject the first NFUpdate or NFDeregister request.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
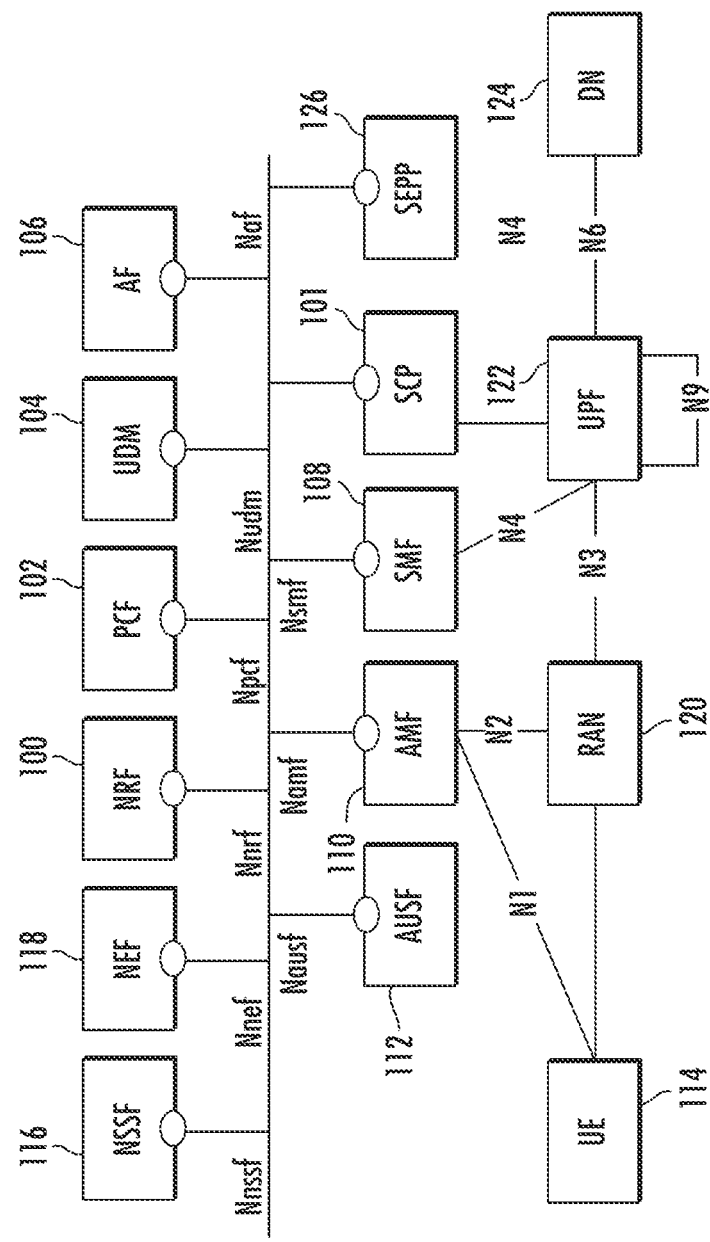
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a UDM function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
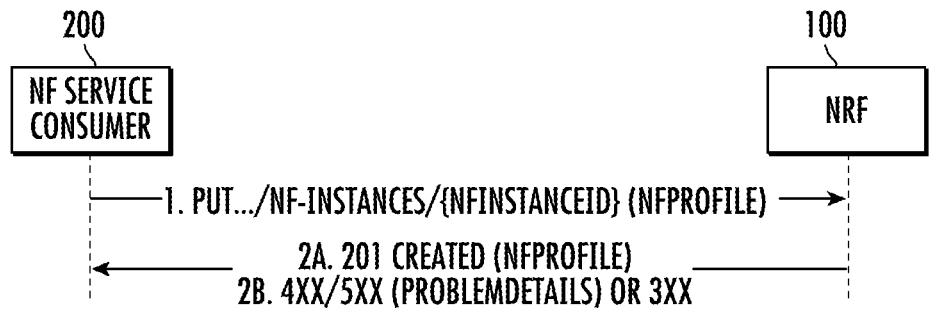
FIG. 2 is a message flow diagram illustrating exemplary messages exchanged for the NFRegister service operation

As described above, one problem that exists in 5G networks is lack of sufficient security for the NF update and deregister operations and, particularly, the lack of assurance that an NF performing an NFUpdate or NFDeregister service operation is the same NF that performed the NFRegister operation for the same NF profile. FIG. 2 is a message flow diagram illustrating exemplary messages that may be exchanged in performing the NFRegister service operation. The NFRegister service operation is defined in 3GPP TS 29.510. The NFRegister service operation is used to register an NF with the NRF by providing the NF profile of the requesting NF to the NRF. The NF profile is a data structure that describes the NF, the services offered by the NF, and identities for communicating with the NF. When an NF successfully invokes the NFRegister service operation, the NRF marks the requesting NF as available to be discovered by other NFs. The NFRegister service operation is also used to register services associated with an existing NF instance. The NFRegister service operation is also used to register NRF information and other information, and this information is used for forwarding or redirecting the service discovery request.

Referring to the message flow in FIG. 2, in line 1, a requesting NF service consumer 200 sends a hypertext transfer protocol (HTTP) PUT message to NRF 100. The HTTP PUT message includes a resource uniform resource identifier (URI) representing the NF instance. The variable "nfInstanceId" represents an identifier provided by NF service consumer 200 that is globally unique inside the PLMN of NRF 100 where the NF is being registered. The format of the NF instance ID is a universally unique identifier (UUID) version 4, as described in Internet Engineering Task Force (IETF) request for comments (RFC) 4122.

The payload body of the PUT request contains a representation of the NF instance to be created. In the example in FIG. 2, the representation is specified by the NF profile. The NF profile is a data structure that includes the attributes illustrated in Table 6.1.6.2.2-1 of 3GPP TS 29.510. The NF profile includes attributes that describe the 5G network function being registered. If another NF accidentally or intentionally modifies or replaces any of these attributes, communications with the registered NF instance can be disrupted, and the modified NF profile can be used to direct attacks at subscribing NFs.

In line 2a of FIG. 2, upon successful registration of NF instance 200, NRF 100 returns a 201 Created message. The payload body of the 201 Created message contains a representation of the created resource, and the location header of the response contains the URI of the created resource. In addition, NRF 100 returns a heart-beat timer containing the number of expected seconds between two consecutive heart-beat messages from an NF instance 200 to NRF 100. The representation of the created resource may be a complete NF profile or an NF profile including the mandatory attributes of the NF profile and the attributes which NRF 100 added or changed.

In line 2b, on failure or redirection, if the registration of NF instance 200 fails at NRF 100 due to errors in the encoding of the NF profile JavaScript Object Notation (JSON) object, NRF 100 returns a 4xx bad request status code with a problem details information element providing details of the error if the registration of the NF instance fails at NRF 100 due to internal errors. NRF 100 returns a 5xx internal server error status code with the problem details information element providing details of the error. In the case of redirection, NRF 100 returns a 3xx status code which contains a location header with a URI pointing to the endpoint of another NRF service instance.

Figure 3:
FIG. 3 is a message flow diagram illustrating exemplary messages exchanged for the NFUpdate service operation where the complete NF profile of an NF is replaced.

One service operation that may be used to modify some or all of the parameters in the NF profile is the NFUpdate service operation. FIG. 3 is a message flow diagram illustrating exemplary messages exchanged for the NFUpdate service operation. The NFUpdate service operation updates the profile of an NF previously registered in the NRF by providing the updated NF profile or updated profile parameters of the requesting NF to the NRF. The NFUpdate service operation may apply to the whole profile of the NF (complete replacement of the existing profile by a new profile), or it may apply only to a subset of the parameters of the profile (including adding/deleting/replacing services to the NF profile).

Referring to the message flow in FIG. 3, in line 1, NF service consumer 200 sends an HTTP PUT request to the resource URI representing the NF instance being replaced. The HTTP PUT operation is used when a complete NF profile replacement is requested. If a partial NF profile update is being performed, the consumer NF sends and HTTP PATCH message to the NRF identifying the NF profile parameters to be replaced. If the NFUpdate service operation is being used to update one or more parameters (but not all) of the NF profile, the payload body of the PATCH request contains a "replace" operation on the attribute of the NF Profile of the NF Instance being replaced along with a new value for the attribute. An HTTP PUT or PATCH request sent to an NRF to replace some or all of an NF profile is referred to interchangeably herein as an "NFUpdate request" or an "NF update request".

In line 2a of FIG. 3, on success, NRF 100 returns a 204 No Content message. NRF 100 may also answer with a 200 OK message, along with the full NF Profile, e.g., in cases where NRF 100 determines that the NF profile has changed significantly since the last heart-beat and wants to send the new profile to NF service consumer 200.

In line 2b of FIG. 3, on failure or redirection, if the NF instance identified by the nfInstanceId is not found in the list of registered NF instances in the NRF's database, NRF 100 returns a "404 Not Found" status code with the Problem Details IE providing details of the error. In the event of redirection, NRF 100 returns a 3xx status code, which contains a location header with a URI pointing to the endpoint of another NRF service instance.

From the message flow illustrated in FIG. 3, it is apparent that if an unauthorized party performs the NF update operation on the NF profile of NF 200, the NF profile can be modified, which can disrupt communications and/or serve as a basis for attacking subscribing NFs. An unauthorized party can modify the NF profile of NF instance or NF service consumer 200 by sending an HTTP PUT or PATCH message to NRF 100 specifying the NF instance ID of consumer NF 200 and one or more NF profile attributes to be modified.

Figure 4:
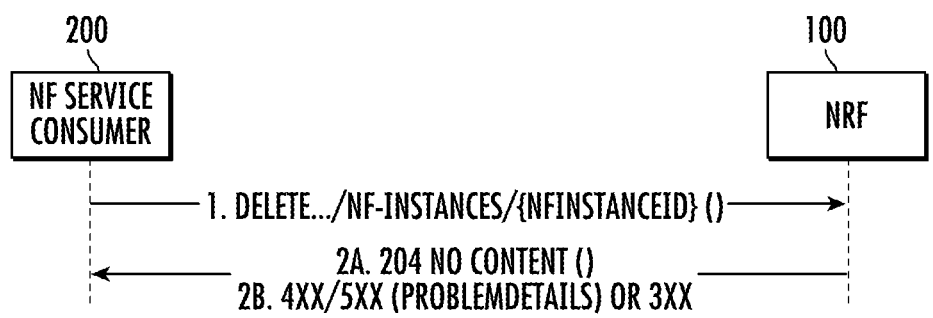
FIG. 4 is a message flow diagram illustrating exemplary messages exchanged for the NFDeregister service operation.

Another service operation that can be used to affect an NF profile of is the NFDeregister service operation. FIG. 4 is a message flow diagram illustrating exemplary messages exchanged in the NFDeregister service operation. Referring to the message flow in FIG. 4, NF service consumer 200, in line 1, invokes the NFDeregister service operation by sending an HTTP DELETE request to NRF 100. The resource URI in the DELETE request identifies the NF instance or NF instances being deleted. Thus, a single HTTP DELETE request can be used to delete multiple NF profiles registered with the NRF.

Upon successful operation of the DELETE request, in line 2a of the message flow diagram, NRF 100 returns a 204 No Content message. In line 2b of the message flow diagram, if the NF Instance identified by the "nfInstanceId" is not found in the list of registered NF Instances in the NRF's database, NRF 100 returns a "404 Not Found" status code with the ProblemDetails information element (IE) providing details of the error.

In the case of redirection, NRF 100 returns a 3xx status code, which contains a Location header with a URI pointing to the endpoint of another NRF service instance. Thus, because the NFDeregister service operation can be used to delete a registered NF profile at the NRF, it is desirable to provide enhanced security before allowing this operation to be performed.

Section 13.3.1 of 3GPP TS 33.501 explains authentication between the NF and NRF using TLS, NDS/IP, physical security for direct communication. For indirect communication, CCA in addition to mechanisms suggested for direct communication is recommended. It should also be noted that CCA relies on public key infrastructure (PKI) certificates, which requires access to the PKI. 3GPP has not mandated a particular authentication mechanism, which may cause a security problem. For example, in indirect communication, multiple options are available. One of the options is implicit, which relies on hop-to-hop security protection making security only as strong as the weakest hop between the NRF and the NF.

TLS or NDS/IP may not be end-to-end because of the intermediaries, such as an SCP or API Gateway (Reverse Proxy). A 5G NF consists of multiple microservices which are generally behind an API gateway, which may also be acting as an TLS terminating point. The internal traffic between API gateway and backend microservices may not be TLS encrypted. A hacker having access to the internal network may be able to spoof the identity of the client and sniff traffic.

The CCA may be stolen by a hacker and used for NFUpdate and NFDeregister service operations. CCA is applicable only to indirect communication and optional. As described above, the NRF provides service operations to update and deregister an already registered NF. The NRF needs to make sure that the NFUpdate and NFDeregister service operations are invoked only by the NF that performed the NFRegister operation.

The 3GPP provides no recommendation on how to make sure that the NF performing NFUpdate or NFDeregister service operations is the same NF that performed the corresponding NFRegister service operation. The 3GPP recommends authentication mechanisms but does not specify an application level mechanism to restrict a hacker from calling NFUpdate or NFDeregister service operations. The authentication mechanisms for NFUpdate and NFDeregister service operations are platform dependent. For example, TLS, NDS/IP, and PKI (needed for CCA) are platform dependent and costly to implement. As are result, these security mechanisms are sometimes avoided by the network operator. Even when TLS, NDS/IP, PKI are provided, they may not be used for end-to-end security due to the microservices architecture where the TLS connection may be terminating at the API Gateway. A hacker may also be able to find weakness in the TLS, NDS/IP, PKI based authentication mechanism. The TLS, NDS/IP, PKI mechanisms are general authentication mechanisms, rather than validating that the NFUpdate and NFDeregister operations are performed by the client that performed the NFRegister service operation. As a result, any authenticated NF may be able to perform NFUpdate or NFDeregister service operation for another NF. Security needs to be enhanced by using multi-factor authentication, rather than relying on single factor authentication for critical operations like NFUpdate and NFDeregister.

There is a need to improve the security of NFUpdate and NFDeregister service operations by verifying that the operations are performed by the NF that performed the NFRegister operation. The NFUpdate and NFDeregister operations are critical operations and need enhanced security and/or defensive measures.

Figure 5:
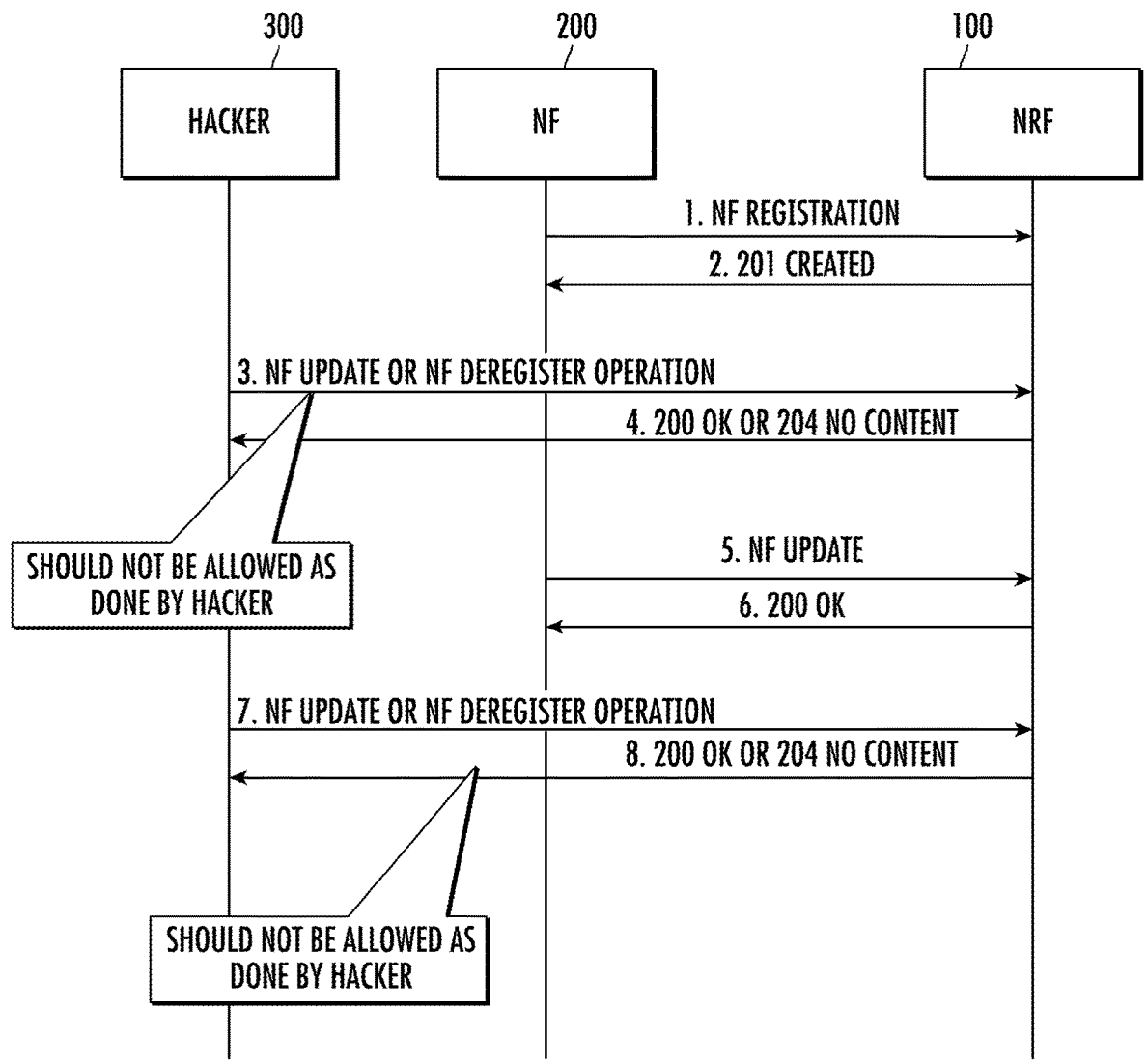
FIG. 5 is a message flow diagram illustrating exemplary messages exchanged where an attacker or unauthorized party is allowed to perform an NF update or deregister operation.

As stated above, a hacker who is able to find the NF instance ID for a registered NF and can spoof the TLS identity is able to send an NF update or NF deregister request on behalf of an already registered NF at the NRF. There is a need to allow only the NF that performed the registration to perform either the NF update or deregister operations. FIG. 5 is a message flow diagram illustrating the vulnerabilities related to the NF update and NF deregister service operations. Referring to FIG. 5 in line 1, NF 200 sends an NF registration request to NRF 100. In line 2, assuming the registration is successful, NRF 100 responds with a 201 Created message.

In line 3, a hacker 300 sends and NF update or NF deregister request to NRF 100 with the NF instance ID of NF 200. If the operation is successful, in line 4, NRF 100 returns a 200 OK or 204 No Content message indicating that the NF profile was successfully replaced, deleted or modified.

In line 5 of the message flow diagram, NF 200 sends an NF update request to update or replace its profile with NRF 100. In line 6, NRF 100 returns a 200 OK message if the NF update operation was successful. If hacker 300 obtains the NF instance ID used in the NF update message in line 5, hacker 300 can send another NF update or an NF deregister request to NRF 100. Such a message is indicated in line 7 where hacker 300 sends and NF update or NF deregister request using the NF instance ID learned from the NF update message in line 5. NRF 100 in line 8 responds with a 200 OK or 204 No Content message if the NF update operation or deregister operation was successful. Accordingly, FIG. 5 illustrates the need to secure the NF update and NF deregister service operations.

Figure 6:
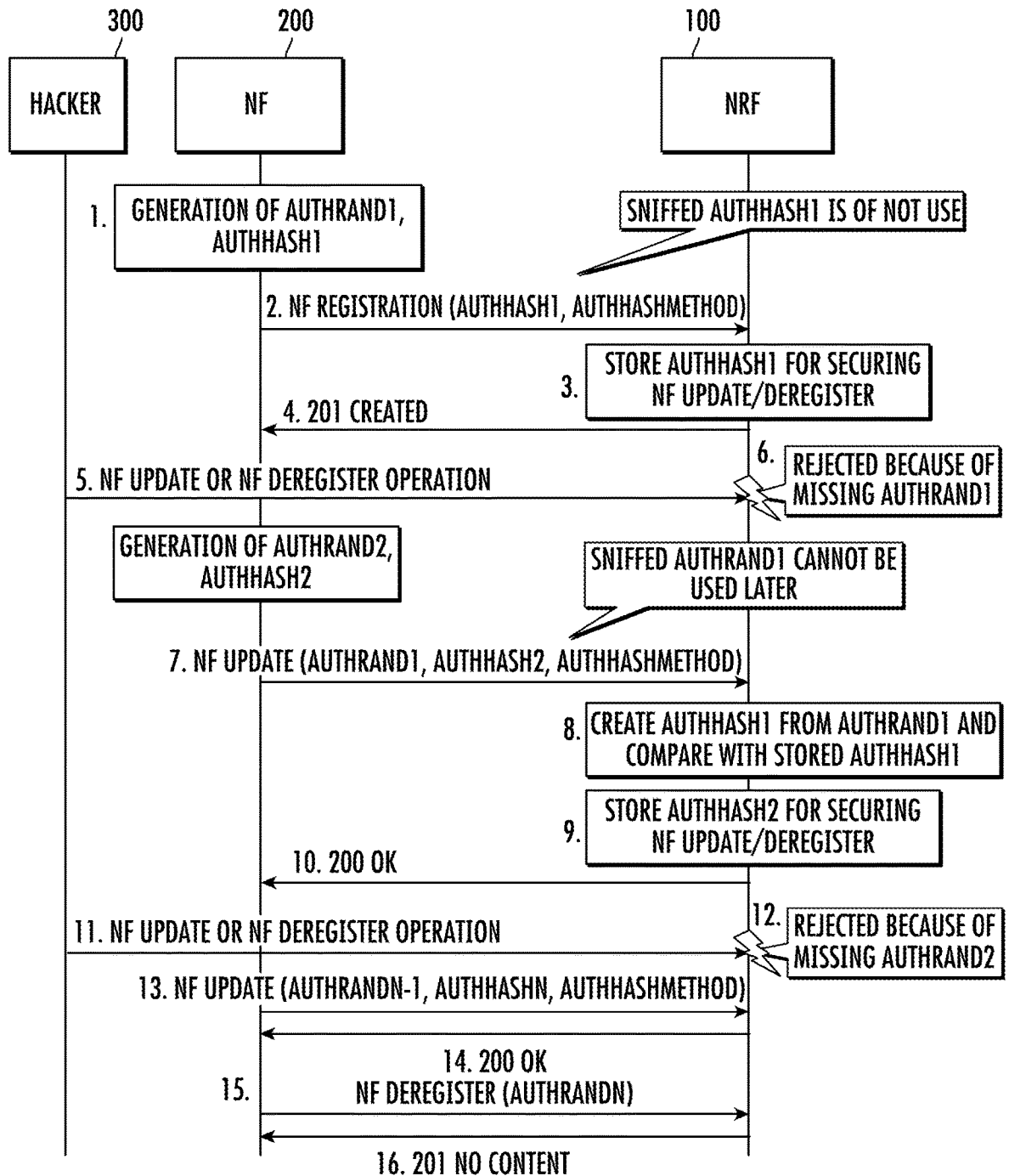
FIG. 6 is a message flow diagram illustrating exemplary messages exchanged and steps performed for mitigating NF update and NF deregister attacks.

FIG. 6 is a message flow diagram illustrating exemplary messages for mitigating NF update and NF deregister attacks. Referring to FIG. 6, in step 1, NF 200 generates a first authentication string. In one example, the first authentication string is a cryptographic pseudorandom string that is difficult to guess by others. This first authentication string is illustrated in FIG. 6 as AuthRand1. NF 200 then generates a hash of AuthRand1 using a known hashing algorithm, such as secure hash algorithm (SHA)-256. The hash of AuthRand1 is illustrated in FIG. 6 as AuthHash1.

In step 2, NF 200 sends and NF registration request to NRF 100. The NF registration request includes AuthHash1 and an identifier for the hash method used to generate AuthHash1, which is illustrated in FIG. 6 as AuthHashMethod. It should be noted that AuthRand1 is not communicated in the registration request. In addition, as will be explained in more detail below, even if the value of AuthHash1 is sniffed by a hacker, AuthHash1 cannot be used to successfully invoke an NFUpdate or NFDeregister service operation.

In step 3, NRF 100 stores AuthHash1 for use in authenticating NF update and deregister operations and, in step 4, returns a 201 Created message to NF 200 indicating that the registration was successful.

In step 5, hacker 300 attempts to perform an NF update or NF deregister service operation by sending an HTTP PUT, PATCH, or DELETE message to NRF 100. The HTTP PUT, PATCH, or DELETE message may include the nfInstanceId of NF 200, a URI for the NF profile registered in step 1, and even AuthHash1, if attacker 300 was able to sniff AuthHash1 from the registration request. However, in step 5, NRF 100 receives the NF update or deregister request, checks for an authentication string, computes AuthHashMethod(authentication string) and compares the result to AuthHash1. If AuthHashMethod(authentication string) does not match the stored value of AuthHash1 or if the NF update or deregister request does not include an authentication string, NRF 100 rejects the NF update or NF deregister request. The NF update or NF deregister request is rejected in step 6 because it either does not include an authentication string or because AuthHashMethod(authentication string) does not match AuthHash1.

In step 7, NF 200 sends an NF update request to NRF 100. The NF update request includes the first authentication string, AuthRand1, and a hash, AuthHash2, of a second authentication string, AuthRand2, selected or generated by NF 200, and an identifier, AuthHashMethod, of the hash method used to generate AuthHash2. It should be noted that choosing a new authentication string for an NF update operation and sending a hash of the new authentication string with the NF update operation will prevent an attacker from sniffing AuthRand1 from an NF update operation and using AuthRand1 to successfully invoke an NF update or deregister operation. Each time NF 200 sends an NF update request, the NF update request includes the authentication string for validating the current NF update request and the hash of the next authentication string for validating the next NF update or NF deregister request. A deregistration request includes the authentication string for validating the deregistration request but does not include a hash of a new authentication string for validating a subsequent request because the NF deregistration request, if successful, deletes the NF profile with the NRF.

In step 8, NRF 100 validates the NF update request by generating AuthHash1 from AuthRand1 in the NF update request, comparing the generated AuthHash1 to the previously stored value for AuthHash1, and determining that the values or strings match.

In step 9, NRF 100 stores AuthHash2 for validating the next NF update or NF deregister request. Because NRF 100 replaces AuthHash1 with AuthHash2, the sniffed value of AuthRand1 cannot be used to successfully invoke an unauthorized NF update or NF deregister service operation. In step 10, NRF 100 sends a 200 OK message to NF 200 indicating that the NF update service operation was successful.

In step 11, hacker 300 initiates an NF update or an NF deregister service operation with NRF 100. The NF update or NF deregister service operation may include the NF instance ID of NF 200 along with the value of AuthRand1 if hacker 300 was able to sniff this value. In step 12, NRF 100 computes AuthHashMethod(AuthRand1), compares the value to AuthHash2, determines that the values do not match, and rejects the NFUpdate or NFDeregister service operation because the values do not match. If the NFUpdate or NFDeregister request does not include an authentication string, NRF 100 may reject the request without performing any comparisons with stored values.

In step 13, NF 200 sends an NF update request to NRF 100. The NF update request includes AuthRandN−1, AuthHashN, and AuthHashMethod. In line 14, NRF 100 validates the NF update request and responds with a 200 OK message.

In line 15, NF 200 sends an NF deregister request to NRF 100. The NF deregister request includes AuthRandN, the authentication string used to generate the hash in the last NF update request. The deregister request does not include a hash of a new authentication string because the NF profile is being deregistered, and, as a result, there will be no more updates to the profile. NRF 100 validates the NF deregister request by computing AuthHashN from AuthRandN, comparing the computed value to the stored value from line 13, and determining that the values match. In line 16, NRF 100 responds to the deregister request with a 201 No Content message indicating that the deregistration was successful.

Thus, FIG. 6 illustrate an exemplary process for securing the NF update and deregister operations by ensuring that only the registering NF can perform these operations. The process in FIG. 6 does not send a secret value over the network that can be sniffed and used by a hacker to perform the NF update and deregister operations without authorization. Using the steps illustrated in FIG. 6, the NF update and NF deregister operations are secure even if a hacker is able to sniff hashed values from previous messages. Because the random authentication string used to create the hash message is only sent in an NF update or NF deregister message and not prior to the NF update or deregister message, it cannot be sniffed and used to update an NF profile at NRF 100 without authorization. In addition, because each NF update request includes a new hash value, sniffing the authentication string from a previous NF update message cannot be used to update an NF profile without authorization.

As stated above, in one example, the authentication string is a randomly generated cryptographic string, and the hash of the random cryptographic string is computed using a standard hashing algorithm, such as SHA-256. The following equation illustrates the computation of the hash:

$$\text{Authentication Hash} = \text{Base64URLENCODE}(\text{SHA256}(\text{Authentication Random String}))$$

In the equation, Authentication Hash is the hash of the authentication string, Authentication Random String is the authentication string, SHA-256 is the hash algorithm, and Base64URLENCODE is the method for encoding the output of the hash function in the message transmitted to the NRF. It should be noted that while SHA-256 is used as an example, other one-way hash functions, such as SHA-1, SHA-384, SHA-521, etc., may be used without departing from the scope of the subject matter described herein. In addition, base 64 URL encoding is one example of a method for encoding the output of the hash function. Other encoding methods can be used without departing from the scope of the subject matter described herein.

Figure 7:
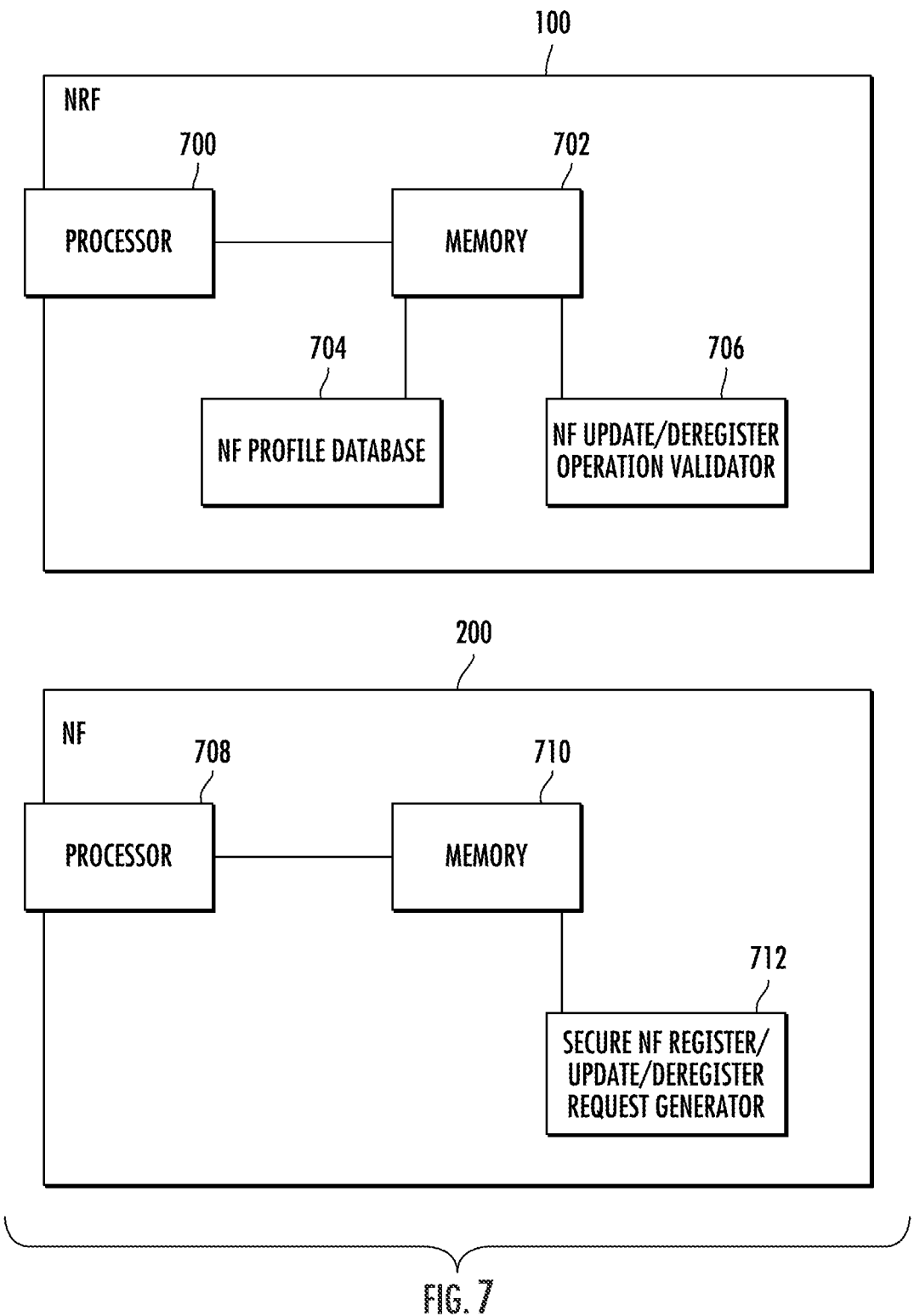
FIG. 7 is a block diagram illustrating architectures for an NRF and an NF for mitigating NF update and NF deregister attacks.

FIG. 7 is a block diagram illustrating an exemplary architecture for NRF 100 and NF 200 in securing the NF update and NF deregister operations. Referring to FIG. 7, NRF 100 includes at least one processor 700 and memory 702. NRF 100 further includes an NF profile database 704 that stores the profiles of registered network functions. NRF 100 includes an NFUpdate/NFDeregister operation validator 706 for validating NF update and NF deregister requests using the methodology described above with regard to FIG. 6. NFUpdate/NFDeregister operation validator 706 may be implemented using computer executable instructions stored in memory 702 and executed by processor 700.

NF 200 includes at least one processor 708 and memory 710. NF 200 further includes a secure NFRegister/Update/Deregister request generator 712 that generates NFRegister, NFUpdate, and NFDeregister requests using the authentication strings and hash values described above with regard to FIG. 6. NFRegister/Update/Deregister request generator 712 may be implemented using computer executable instructions stored in memory 710 and executed by processor 708. NF 200 may be any of the NFs described above with regard to FIG. 1 or any other NF that seeks to register, update, and deregister a profile within NRF 100.

Figure 8:
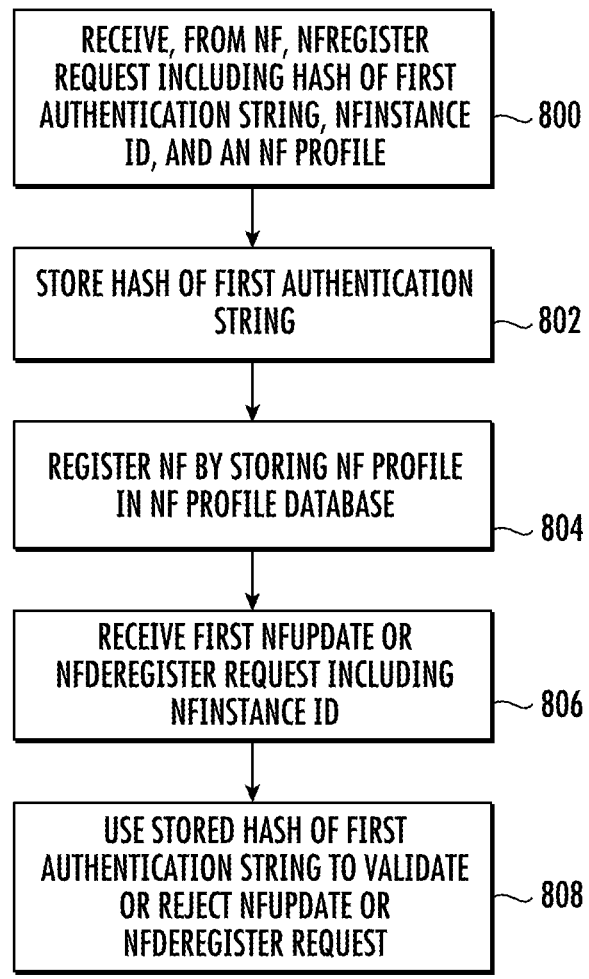
FIG. 8 is a flow chart illustrating an exemplary method performed by an NRF for mitigating NF update and deregister attacks.

FIG. 8 is a flow chart illustrating an exemplary process for performed by an NRF for mitigating NFUpdate and NFDeregister attacks. Referring to FIG. 8, in step 800, the process includes receiving, from an NF, an NFRegister request including a hash of a first authentication string, an NF instance identifier, and an NF profile. The NFRegister request may also include an identifier for the hash method used to generate the hash of the first authentication string. Alternatively, the hash method may be configured in all NFs by the network operator, and thus there is no need to identify the method used in messaging between NFs.

In step 802, the process includes storing the hash of the first authentication string. For example, NRF 100 may store in its memory the hash of the first authentication string obtained from the NFRegister request.

In step 804, the process includes registering the NF by storing the NF profile in an NF profile database. For example, NRF 100 may store the NF profile in NF profile database 704. NRF 100 may also respond to the NFRegister request with a 201 Created message.

In step 806, the process includes receiving a first NFUpdate or NFDeregister request including the NF instance identifier. For example, NRF 100 may receive an NFUpdate or NFDeregister request that includes an NF instance identifier that is the same as the NF instance identifier from the NFRegister request. If the request is an NFUpdate request, the request may include one or more NF profile parameters to be modified and operations to perform on the parameters The NFUpdate or NFDeregister request may also include an authentication string and a hash of a next authentication string.

In step 808, the process includes using the stored hash of the first authentication string to validate or reject the first NFUpdate or NFDeregister request. For example, assuming that the NFUpdate or NFDeregister request includes an authentication string, NRF 100 computes a hash of the authentication string in the message, compares the computed hash to the hash stored in step 800, determines that the hashes match, and validates the request if the hashes match. If the hashes do not match or if the NFUpdate or NFDeregister request does not include an authentication string, NRF 100 may reject the request. NRF 100 may also store the hash of the next authentication string received in the NFUpdate or NFDeregister request for use in validating the next NFUpdate or NFDeregister request.

Figure 9:
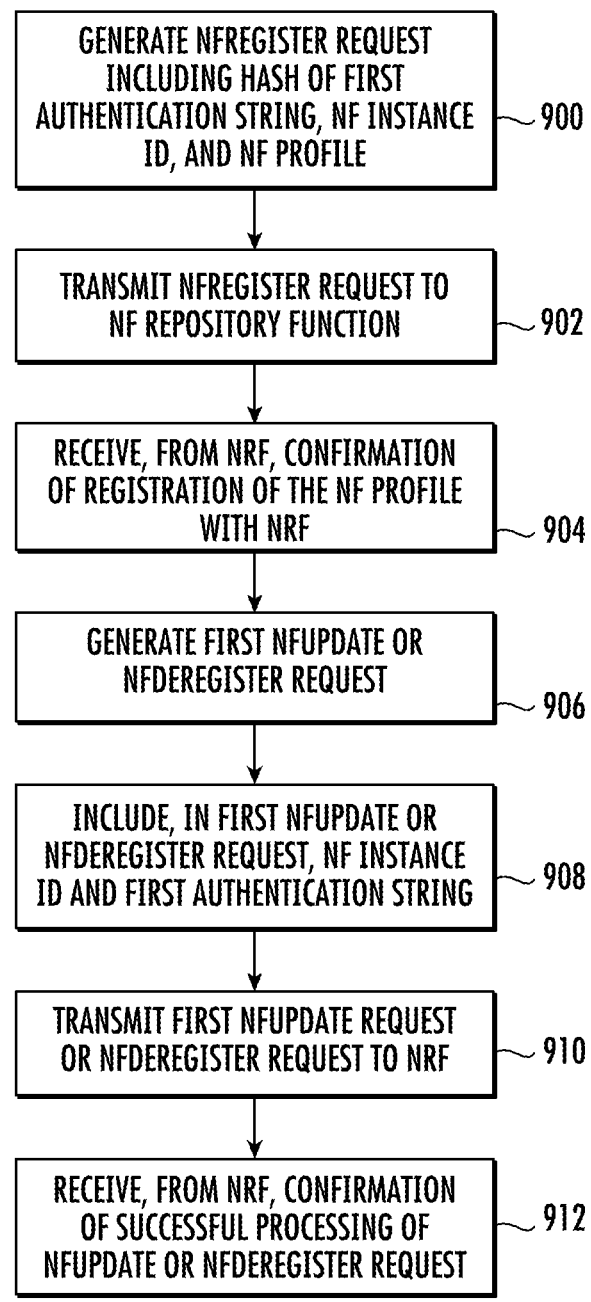
FIG. 9 is a flow chart illustrating an exemplary method performed by an NF for mitigating NF update and deregister attacks.

FIG. 9 is a flow chart illustrating an exemplary process performed by an NF in mitigating NFUpdate and NFDeregister attacks. Referring to FIG. 9, in step 900, the process includes generating an NFRegister request including a hash of a first authentication string, an NF instance identifier, and an NF profile. For example, NF 200 may generate an NFRegister request including an NF instance identifier, an NF profile, and a hash of a first authentication string. The NF register message may also include an identifier for the hash algorithm. Alternatively, the NFs in an operator's network may be configured to use the same hash algorithm to secure NFUpdate and NFDeregister operations, so that the identifier for the hash algorithm is not exchanged in messages between NFs.

In step 902, the process includes transmitting the NFRegister request to an NF repository function (NRF). For example, NF 200 may transmit the NFRegister request created in step 900 to NRF 100.

In step 904, the process includes receiving, from the NRF, confirmation of registration of the NF profile with the NRF. For example, NRF 100 may receive the NFRegister request, store the NF profile in its NF profile database, store the hash of the authentication string in the NF profile database, and respond with a 201 Created message, which NF 200 receives in step 904.

In step 906, the process includes generating a first NFUpdate or NFDeregister request. For example, NF 200 may generate an NFUpdate or NFDeregister request to update or deregister its NF profile with NRF 100.

In step 908, the process comprises, including, in the first NFUpdate or NFDeregister request, the NF instance ID and the first authentication string. For example, NF 200 may include, in the NFUpdate or NFDeregister request, the NF instance ID of the NF instance whose NF profile is being updated or deregistered and the authentication string used to generate the hash in step 802. NF 200 may also include a hash of a second authentication string in the NFUpdate or NFDeregister request.

In step 910, the process includes transmitting the first NFUpdate or NFDeregister request to the NRF. For example, NF 200 may transmit the NFUpdate or NFDeregister request to NRF 100.

In step 912, the process includes receiving, from the NRF, confirmation of successful processing of the first NFUpdate or NFDeregister request. For example, NRF 100 may receive the NFUpdate or Deregister request, compute a hash of the authentication string in the NFUpdate or NFDeregister request, compare the computed hash to the hash received in the NFRegister request or the previous NFUpdate request, determine that the values match, and send a success message (200 OK or 204 No Content) message to NF 200, which NF 200 receives in step 912.

Thus, the subject matter described herein provides enhanced security for NFUpdate and NFDeregister service operations. By using an authentication string that is updated with each NFUpdate request and that is only used once for validation, the likelihood that an NFUpdate or NFDeregister service operation is being performed by the NF that registered the NF profile being updated or deregistered is increased.

Exemplary advantages of the subject matter described herein include mitigating security attacks related to NF Update, NF Deregister and other similar messages. The methodology described herein reduces the likelihood of successful denial of service (DoS) attacks for NF Update, NF Deregister and other similar messages. The methodology is extensible to other SBI messages where there is a need that a subsequent message needs to be from the same client who sent the initial message. The security methodology described herein can be implemented on the NRF and any NF, such as a PCF, BSF, SCP, SEPP, NSSF, NEF, or UDR.

The disclosure of each of the following references is incorporated herein by reference in its entirety.

REFERENCES 1. 3GPP TS 33.501 V17.0.0 (2020-12), 3rd Generation Partnership Project; Technical Specification Group Services and System Aspects; Security architecture and procedures for 5G system (Release 17).
2. 3GPP TS 29.510 V17.0.0 (2020-12); 3rd Generation Partnership Project; Technical Specification Group Core Network and Terminals; 5G System; Network Function Repository Services; Stage 3 (Release 17).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for mitigating network function (NF) update and deregister attacks, the method comprising:

at an NF repository function (NRF) implemented by at least one processor:
receiving, from an NF, an NFRegister request including a hash of a first authentication string, an NF instance identifier, and an NF profile;
storing the hash of the first authentication string;
registering the NF by storing the NF profile in an NF profile database;
receiving a first NFUpdate request including the NF instance identifier; and
using the stored hash of the first authentication string to validate or reject the first NFUpdate request, wherein receiving the first NFUpdate request includes receiving the first NFUpdate request including an authentication string and wherein using the stored hash of the first authentication string to validate or reject the first NFUpdate request includes computing a hash of the authentication string from the first NFUpdate request, comparing the hash of the authentication string from the first NFUpdate request to the stored hash of the first authentication string, determining that the hash of the authentication string from the first NFUpdate request matches the stored hash of the first authentication string, and, in response, validating the first NFUpdate request.

2. The method of claim 1 wherein the first NFUpdate request includes a hash of a second authentication string and wherein the method further comprises storing the hash of the second authentication string and using the hash of the second authentication string to validate a second NFUpdate or NFDeregister request received after the first NFUpdate request.

3. A method for mitigating network function (NF) update and deregister attacks, the method comprising:
at an NF repository function (NRF) implemented by at least one processor:
receiving, from an NF, an NFRegister request including a hash of a first authentication string, an NF instance identifier, and an NF profile;
storing the hash of the first authentication string;
registering the NF by storing the NF profile in an NF profile database;
receiving a first NFDeregister request including the NF instance identifier; and
using the stored hash of the first authentication string to validate or reject the first NFDeregister request, wherein receiving the first NFDeregister request includes receiving the first NFDeregister request including an authentication string that is different from the first authentication string and wherein using the stored hash of the first authentication string to validate or reject the first NFDeregister request includes computing a hash of the authentication string from the first NFDeregister request, comparing the hash of the authentication string from the first NFDeregister request to the stored hash of the first authentication string, determining that the hash of the authentication string from the first NFDeregister request does not match the stored hash of the first authentication string, and, in response, rejecting the first NFDeregister request.

4. A method for mitigating network function (NF) update and deregister attacks, the method comprising:
at a network function including at least one processor:
generating an NFRegister request including a hash of a first authentication string, an NF instance identifier, and an NF profile;
transmitting the NFRegister request to an NF repository function (NRF);
receiving, from the NRF, confirmation of registration of the NF profile with the NRF;
generating a first NFUpdate request;
including, in the first NFUpdate request, the NF instance identifier, the first authentication string, and a hash of a second authentication string;
transmitting the first NFUpdate request to the NRF;
receiving, from the NRF, confirmation of successful processing of the first NFUpdate request; and
generating a second NFUpdate request, including, in the second NFUpdate request, the second authentication string, and transmitting the second NFUpdate request to the NRF.

5. A system for mitigating network function (NF) update and deregister attacks, the system comprising:
an NF repository function (NRF) including at least one processor and a memory; and
an NFUpdate/NFDeregister operation validator implemented by the at least one processor for receiving, from an NF, an NFRegister request including a hash of a first authentication string, an NF instance identifier, and an NF profile, storing the hash of the first authentication string, registering the NF by storing the NF profile in an NF profile database, receiving a first NFUpdate request including the NF instance identifier; and using the stored hash of the first authentication string to validate or reject the first NFUpdate request, wherein receiving the first NFUpdate request includes receiving the first NFUpdate request including an authentication string and wherein using the stored hash of the first authentication string to validate or reject the first NFUpdate request includes computing a hash of the authentication string from the first NFUpdate request, comparing the hash of the authentication string from the first NFUpdate request to the stored hash of the first authentication string, determining that the hash of the authentication string from the first NFUpdate request matches the stored hash of the first authentication string, and, in response, validating the first NFUpdate request.

6. The system of claim 5 wherein the first NFUpdate request includes a hash of a second authentication string and wherein the NFUpdate/NFDeregister operation validator is configured to store the hash of the second authentication string and use the hash of the second authentication string to validate a second NFUpdate or NFDeregister request received after the first NFUpdate request.

7. A system for mitigating network function (NF) update and deregister attacks, the system comprising:
an NF repository function (NRF) including at least one processor and a memory; and
an NFUpdate/NFDeregister operation validator implemented by the at least one processor for receiving, from an NF, an NFRegister request including a hash of a first authentication string, an NF instance identifier, and an NF profile, storing the hash of the first authentication string, registering the NF by storing the NF profile in an NF profile database, receiving a first NFDeregister request including the NF instance identifier, and using the stored hash of the first authentication string to validate or reject the first NFDeregister request, wherein receiving the first NFDeregister request includes receiving the first NFDeregister request including an authentication string that is different from the first authentication string and wherein using the stored hash of the first authentication string to validate or reject the first NFDeregister request includes computing a hash of the authentication string from the first NFDeregister request, comparing the hash of the authentication string from the first NFDeregister request to the stored hash of the first authentication string, determining that the hash of the authentication string from the first NFDeregister request does not match the stored hash of the first authentication string, and, in response, rejecting the first NFDeregister request.

8. A system for mitigating network function (NF) update and deregister attacks, the system comprising: an NF including at least one processor and a memory; and an NFRegister/Update/Deregister request generator implemented by the at least one processor for generating an NFRegister request including a hash of a first authentication string, an NF instance identifier, and an NF profile, transmitting the NFRegister request to an NF repository function (NRF), receiving, from the NRF, confirmation of registration of the NF profile with the NRF, generating a first NFUpdate request, including, in the first NFUpdate request, the NF instance identifier and the first authentication string, transmitting the first NFUpdate request to the NRF; and receiving, from the NRF, confirmation of successful processing of the first NFUpdate request, wherein generating the first NFUpdate request comprises including, in the first NFUpdate request, a hash of a second authentication string and wherein the NFRegister/Update/Deregister request generator is configured to generate a second NFUpdate request, include, in the second NFUpdate request, the second authentication string, and transmit the second NFUpdate request to the NRF.

9. A non-transitory computer readable medium having stored thereon executable instructions that when executed by a processor of a computer control the computer to perform steps comprising:
  at a network function (NF) repository function (NRF) implemented by at least one processor:
    receiving, from an NF, an NFRegister request including a hash of a first authentication string, an NF instance identifier, and an NF profile;
    storing the hash of the first authentication string;
    registering the NF by storing the NF profile in an NF profile database;
    receiving a first NFUpdate request including the NF instance identifier; and
    using the stored hash of the first authentication string to validate or reject the first NFUpdate request, wherein receiving the first NFUpdate request includes receiving the first NFUpdate request including an authentication string and wherein using the stored hash of the first authentication string to validate or reject the first NFUpdate request includes computing a hash of the authentication string from the first NFUpdate request, comparing the hash of the authentication string from the first NFUpdate request to the stored hash of the first authentication string, determining that the hash of the authentication string from the first NFUpdate request matches the stored hash of the first authentication string, and, in response, validating the first NFUpdate request.

* * * * *

UNITED STATES PATENT AND TRADEMARK OFFICE
CERTIFICATE OF CORRECTION

PATENT NO.         : 11,888,894 B2
APPLICATION NO.    : 17/236775
DATED              : January 30, 2024
INVENTOR(S)        : Rajput et al.

It is certified that error appears in the above-identified patent and that said Letters Patent is hereby corrected as shown below:

In the Specification

In Column 1, Line 37, delete "network function" and insert -- network --, therefor.

In Column 2, Line 12, delete "3GGP" and insert -- 3GPP --, therefor.

In Column 5, Line 31, delete "operation" and insert -- operation; --, therefor.

In Column 6, Line 44, delete "transmission" and insert -- transport --, therefor.

In Column 9, Lines 10-16, delete "3GPP has not mandated a particular authentication mechanism, which may cause a security problem. For example, in indirect communication, multiple options are available. One of the options is implicit, which relies on hop-to-hop security protection making security only as strong as the weakest hop between the NRF and the NF." and insert the same on Column 9, Line 11 as a new paragraph.

In Column 13, Line 23, delete "parameters" and insert -- parameters. --, therefor.

Signed and Sealed this
Fourteenth Day of May, 2024

Katherine Kelly Vidal
*Director of the United States Patent and Trademark Office*